United States Patent

[11] 3,634,004

| [72] | Inventor | Thomas W. Howard<br>Bushey, England |
|---|---|---|
| [21] | Appl. No. | 727,496 |
| [22] | Filed | May 8, 1968 |
| [45] | Patented | Jan. 11, 1972 |
| [73] | Assignee | Metro-Goldwyn-Mayer British Studios Limited<br>Boreham Wood, Hertfordshire, England<br>a part interest |
| [32] | Priority | May 11, 1967 |
| [33] | | Great Britain |
| [31] | | 21,987/67 |

[54] FRONT PROJECTION COMPOSITE CINEMATOGRAPHY
11 Claims, 8 Drawing Figs.

[52] U.S. Cl............................................. 352/47, 352/89
[51] Int. Cl........................................G03b 21/32
[50] Field of Search............................................ 352/40, 47, 89; 353/101, 76

[56] References Cited
UNITED STATES PATENTS

| 2,073,998 | 3/1937 | Raby............................ | 95/86 X |
| 2,198,815 | 4/1940 | Haskin........................ | 352/40 |
| 2,729,141 | 1/1956 | Walker........................ | 352/89 |
| 2,857,806 | 10/1958 | Shuftan....................... | 352/89 |
| 3,059,525 | 10/1962 | Shuftan....................... | 352/89 |
| 3,155,978 | 11/1964 | Seitz............................ | 352/47 |
| 3,366,438 | 1/1968 | Hartman..................... | 352/47 X |

*Primary Examiner*—Samuel S. Matthews
*Assistant Examiner*—Michael D. Harris
*Attorney*—Stevens, Davis, Miller & Mosher

ABSTRACT: A projection system in the process of composite cinematography is known as front projection. A background scene is projected on to a screen using a projector in which the light source and condenser system are located in separate housings so that the condensers can be positioned to give large screen projection without reduction in photographic quality. A mobile unit is also provided on which the projector, lens, mirror and camera are adjustably mounted in spaced relationship. The slide holder may be adjustably mounted on the condenser housing to give a movable background scene.

FRONT PROJECTION COMPOSITE CINEMATOGRAPHY

This invention relates to projection systems and in particular, but not exclusively, to an apparatus utilizing the improved projection system in the process of composite cinematography known as front projection.

In the art of composite cinematography the process of front projection is a system in which a separately photographed scene is projected onto a screen, using a conventional motion picture or stills projector. The projected picture is reflected onto the screen from the surface of a semimirror which is positioned at an angle of approximately 45° to the optical axis of projection onto the screen. A foreground setpiece or artist is placed in front of the screen and separately illuminated to give sufficient photographic exposure in a normal motion picture camera which is set up to photograph the combined scene directly through the semimirror along the optical axis of the reflected projection beam so as to produce the "composite" cinematograph film.

The process of front projection as described above has certain limitations. Firstly the projection systems of conventional projections are not capable of large screen projection without reduction in the photograph quality of the background screen; secondly the light intensity of the background scene as projected on the screen is not sufficient to provide for uniform illumination with the foreground setpiece or artist resulting in poor exposure of the background scene on the final motion picture film.

The present invention sets out to provide a projection system which obviates these limitations of known systems. The main object of the invention is the provision of an improved optical system for the projector which will allow the projection of large pictures for the background scene of good photographic quality. A further object is the provision of an improved screen for increasing the light intensity of the projected picture. Yet a further object is the provision of an apparatus comprising a single mobile unit in which the movements of the projector, the projection mirror and the camera can be fully integrated.

In its broadest aspect the invention is concerned with a projection system comprising a light source such as an arc lamp, a condenser system and a focusing lens. According to the invention the condensers are positioned in a separate housing adjustable with respect to the housing for the source of light. The condensers, contrary to normal practice, are conveniently positioned some distance from the source of light and are large in size; for example, the condensers may have a diameter of 16 inches positioned 16 inches from the light source so as to provide for a wide angle of source collection. The condensers are associated with a wide angle focusing lens and the greatly increased size of the beam passing through the condenser system permits uniform diagonal light coverage of a large photographic field e.g., a 10×8-inch plate so that a large picture can be produced with a relatively short projection throw and without any deterioration of the photographic quality of the picture. In order to improve the light intensity of the projected picture a screen construction is used which comprises a material known as "Scotch Light" and which consists of a reflecting surface formed of aluminum oxide coated with very fine glass beads. The screen material has improved reflective properties which cause the reflection of the projected light substantially back along the path of the projected beam at high light intensity.

The invention will now be described by way of example with reference to the accompanying drawings, in which.

As previously mentioned the present invention is particularly concerned with improvements in the process of composite photography by a system known as front projection. Such a system, including also the improvements of the present invention, is shown diagrammatically in FIG. 1 of the drawings, while the apparatus of the invention for carrying out the improved techniques is shown in FIG. 2 and in detail in the subsequent Figures of the drawings.

Figure 1:
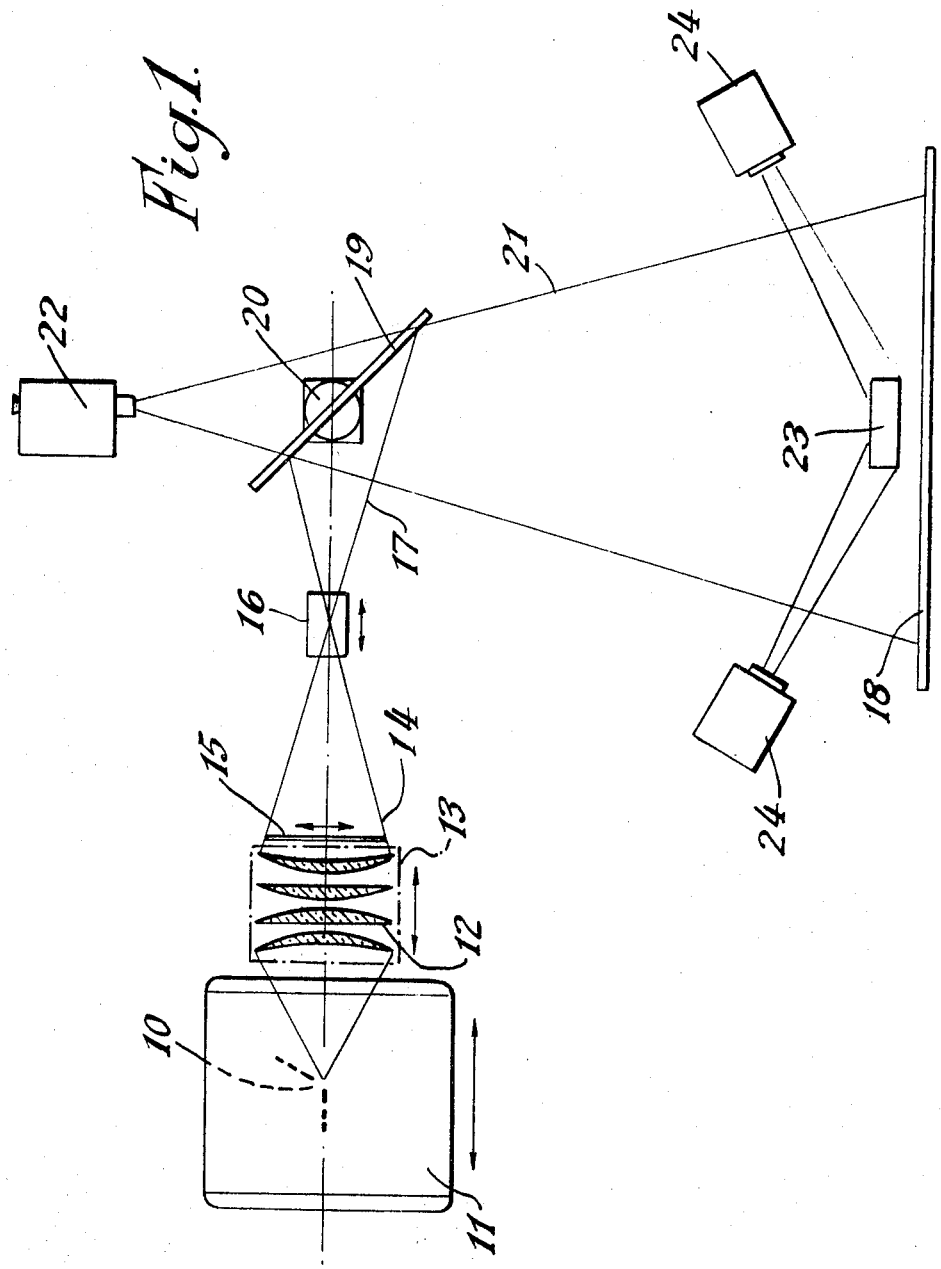
FIG. 1 is a diagrammatic view of the process of front projection in accordance with the invention.
Figure 2:
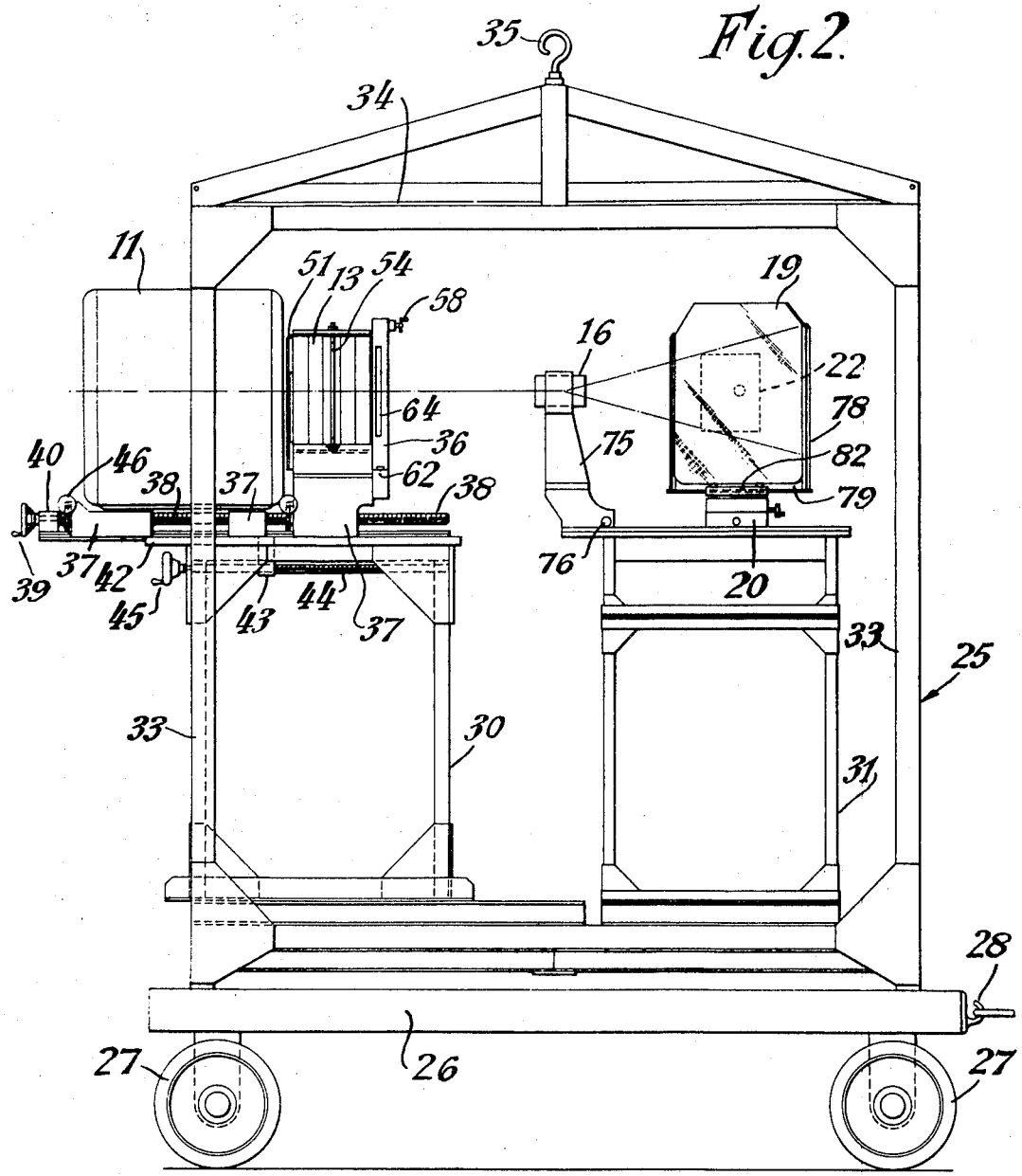
FIG. 2 is a front elevation of a complete mobile unit by which the projector, mirror and camera are fully integrated.

As shown in FIG. 1 the projection system comprises a light source 10, such as an electric arc lamp of conventional construction, which is adjustably positioned in a housing 11, and a condenser system 12 which is associated with the light source 10 but which is located in an entirely separate housing 13. As will be explained hereinafter the condenser housing 13 is adjustable relatively to the lamp housing 11. The arrangement permits the condenser system 12 to be positioned relatively much further from the light source 10 than conventional practice where the condenser system is housed in the front of the lamp housing. In order to provide the same coverage of the light source the condenser system also has a greatly increased size so that the beam of light 14 emanating from the condenser system is of greatly increased area.

In FIG. 1 the condenser system 12 is shown diagrammatically as consisting of two pairs of planoconvex lenses but these are only shown by way of example as the actual bank of lenses may be varied or reduced to suit actual projection requirements.

The background scene which is to form part of the composite pictures is photographed separately, e.g., in color, as a still or as a cinematograph film. The condenser system as described above particularly allows the use of large plates, say 10×8 inches, in view of the greatly increased area of the beam of light 14 from the condenser system. These large plates can therefore be placed closely to the condenser system so as to permit uniform light coverage of the whole photographic field on the plate. In FIG. 1 the plate is shown at 15 and is mounted in a slide holder on the condenser housing 13 as will be hereinafter described.

The condenser system 12 is associated with a wide angle focusing lens 16 and the system is designed to pass the light (beam 14) through the focusing lens 16 so as to project a large picture on a screen with a relatively short projection throw. For example, the invention provides screen picture sizes of 100 feet in width and 80 feet in height at projection throws much less than that of conventional projectors. If desired, the condensers can be adjustably compounded so as to give transmission to wider angle or shorter focal length projection lenses and to permit the substitution of a wide film motion picture head, for example, 70 mm.

Figure 7:
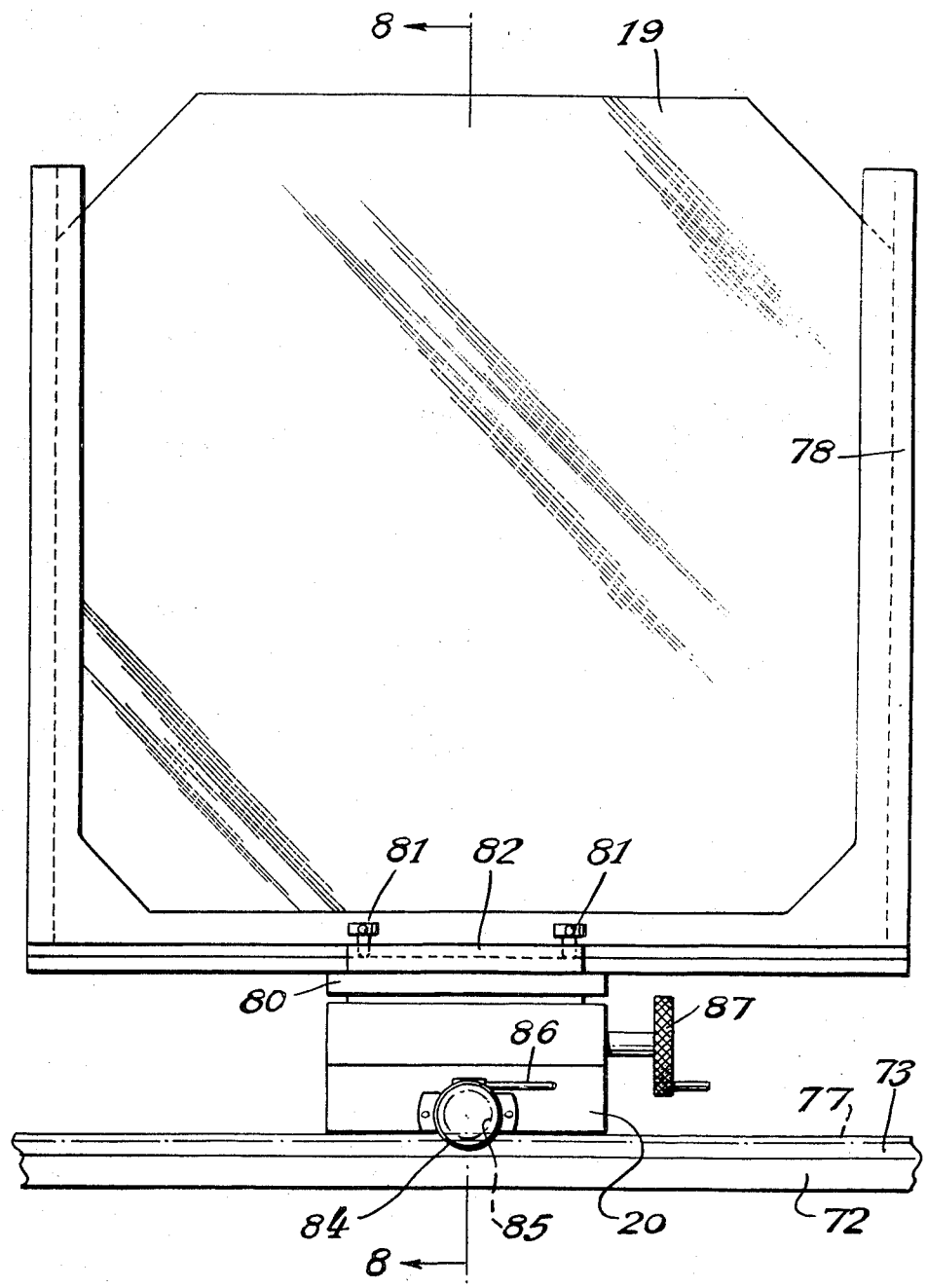
FIG. 7 is a front view of the mirror.
Figure 8:
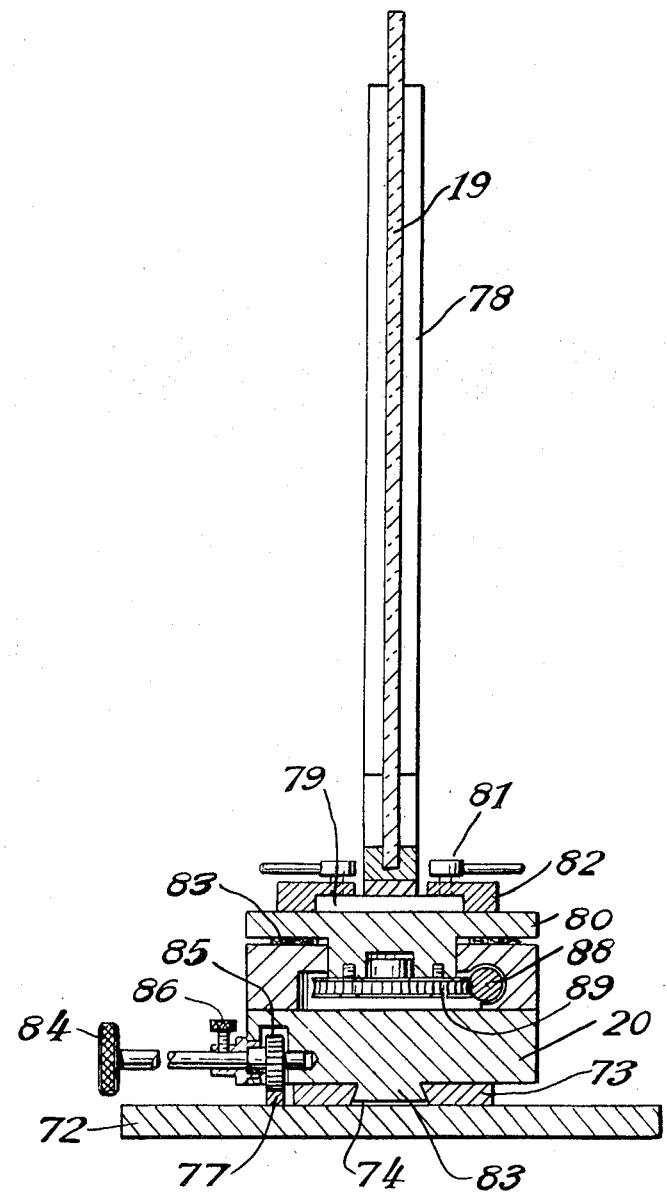
FIG. 8 is a section of the line 8—8 of FIG. 7.

As previously mentioned the projection system is particularly intended for use with the system of front projection in the process of composite photography and to this end the beam 17 emanating from the focusing lens 16 is projected onto a screen 18 after reflection from one or more mirrors. In FIG. 1 one mirror 19 is shown comprising a semimirror in which the front surface is treated, for example, with cobalt or titanium, to allow reflection and the passage therethrough of light rays falling on the surface. The semimirror 19 is adjustably located in a support 20 as will be hereinafter described (FIGS. 7 and 8) and is operatively located at an angle inclined to the optical axis of the projected beam 17 e.g., 45°.

The screen 18 is made of highly reflective material, such as the material known as "Scotch Light" and which comprises aluminum oxide coated with very fine glass beads. The reflective property of the screen material is such that the light rays 21 are returned along substantially the same path as the projected beam 17 at high light intensity and pass through the semimirror 19 to the camera 22.

A setpiece or artist 23 forming the foreground scene is positioned in front of the screen 18 and is separately illuminated e.g., by arc lamps 24, to give sufficient photographic exposure in the camera 22 positioned behind the semimirror 19. Due to the reflective property of the screen 18 a light intensity of the background picture on the screen can be obtained which is similar to that of the foreground scene as required to permit normal motion picture camera speeds of 24 pictures per second. The resulting film as taken by the camera 22 are, therefore, composite pictures of the foreground and background scenes having greatly improved photographic quality due to the increased light intensities and the use of larger fields by reason of the improved optical system for the projector.

The invention also provides an integrated projector, mirror and camera unit which is fully mobile and completely adjustable.

Figure 3:
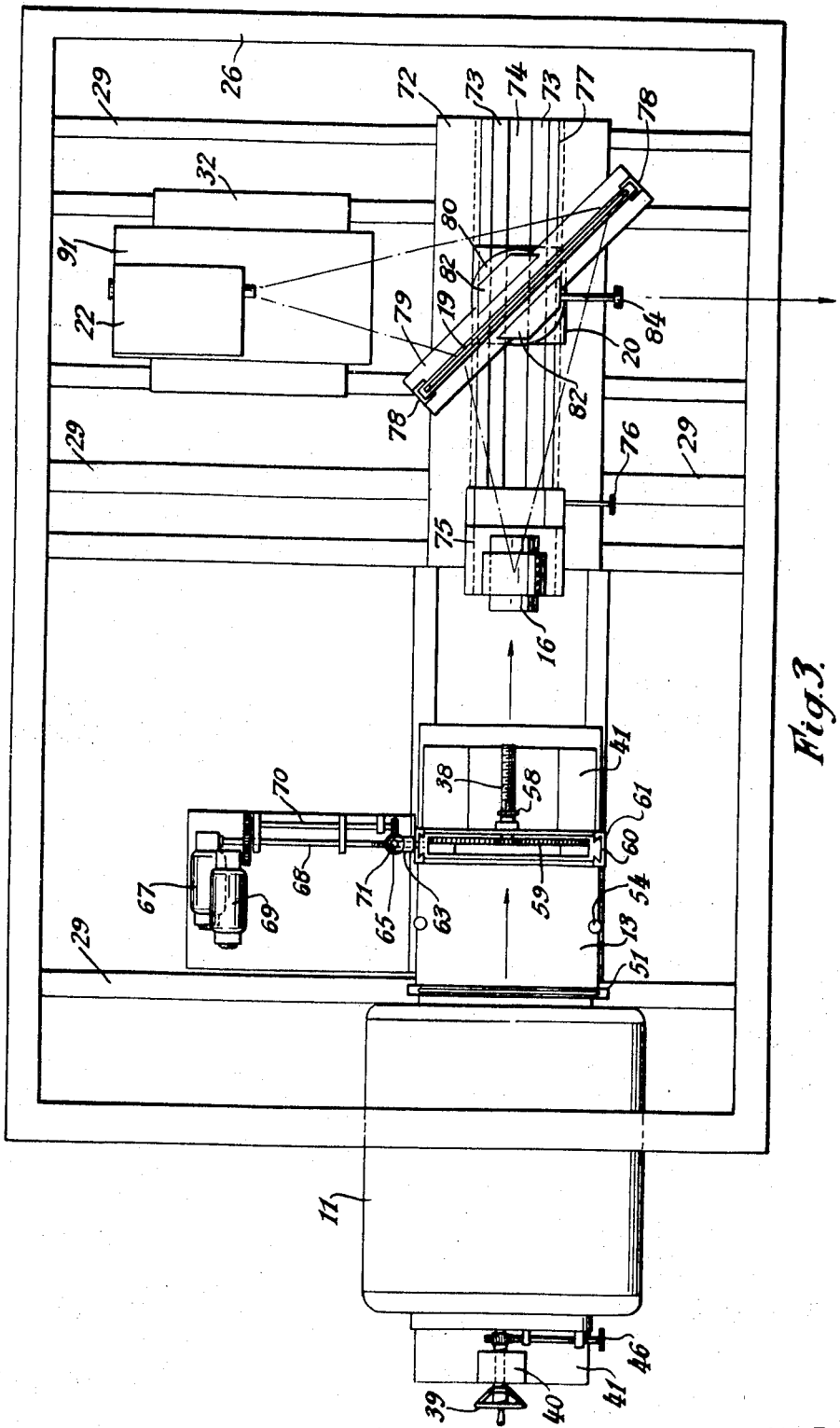
FIG. 3 is a partial plan of the mobile unit.
Figure 4:
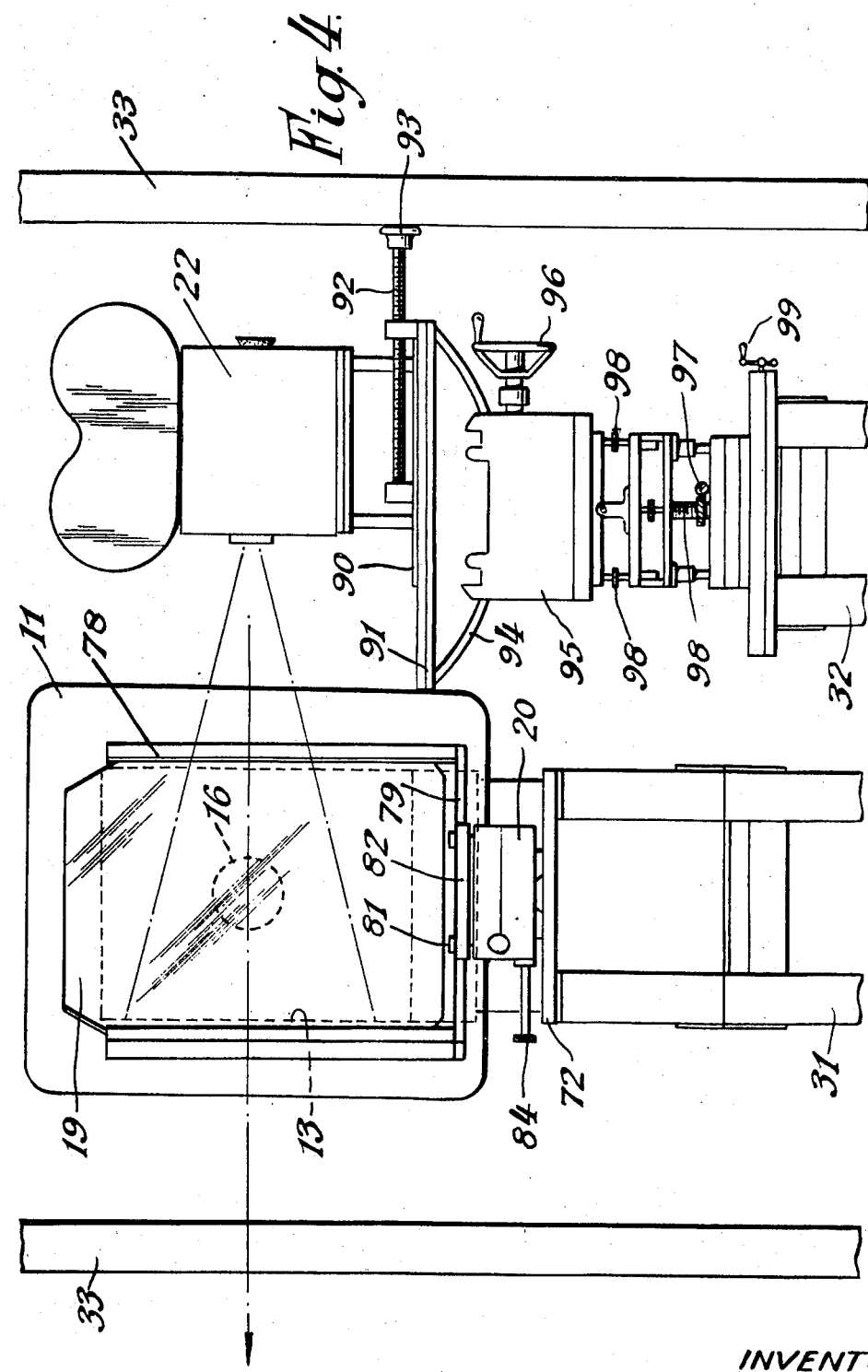
FIG. 4 is a partial side elevation of the unit showing in particular the arrangements for the adjustment of the camera.

The unit is shown more particularly in FIGS. 2 to 4 of the drawings and comprises a wheeled carriage 25 which may be of any convenient construction. The carriage shown in the drawings consists of an open framework of angled-bar construction and includes a rectangular chassis 26 mounted on wheels 27 and provided with a hook 28 to enable the carriage to be moved as required. The chassis 26 includes a number of transverse bars 29 to give support for the separate structures 30, 31, 32 as will be hereinafter described. The framework is completed by side members 33 and the upper rectangular structure 34 provided with hook 35 to enable the unit to be lifted by a sling if desired.

The structure 30 adjustably supports the housing 11 for the light source 10, the housing 13 for the condenser system 12 and the slide holder 36 for the plate 15. As shown more clearly in FIG. 5 of the drawings the housings 11 and 13 are provided with supporting lugs 37 which are threadably mounted on a leadscrew 38 rotatable by a handle 39. The leadscrew 38 is rotatably mounted in bearings 40 in a slide 41 slidably mounted in a platform 42 on the structure 30. The slide 41 has one or more lugs 43 fast to it and threadably mounted on a second leadscrew 44 carried by bearings in the framework of structure 30 and rotatable by handwheel 45.

Leadscrew 44 provides for a fast or coarse adjustment of housing 11 and 13 by moving slide 41 and thereby leadscrew 38, while leadscrew 38 provides a slower or fine adjustment of the housings.

Individual adjustment of the lamp housing 11 relative to condenser housing 13 and the unit 25 is obtained by rotation of handwheel 46 which rotates wormwheel 47 on leadscrew 38 by means of worm 48 (see FIG. 3). A similar individual adjustment of condenser housing 13 is obtained by rotation of worm wheel 49 on leadscrew 38 by handwheel 50.

Figure 5:
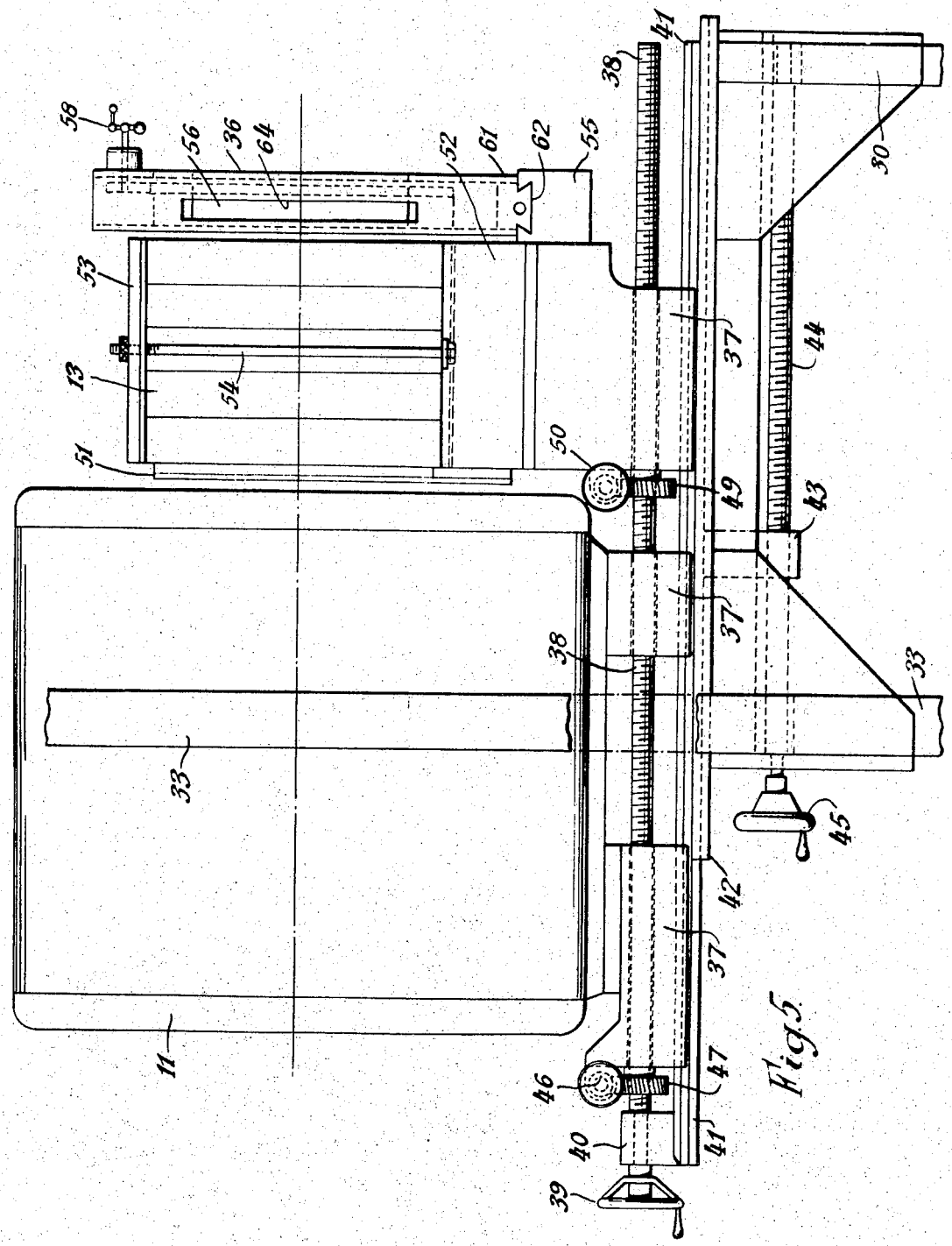
FIG. 5 is an enlarged elevation of the lamp housing and condenser housing with the slide holder.

As shown in FIG. 5 the condenser housing 13 is provided with a heat shield 51 and a number of lenses mounted between a lower support 52 and a top cap member 53 which is held in position by the connecting members 54.

The holder 36 for plate 15 is mounted in a support 55 attached to the lower support 52 of the condenser housing 13 so that the slider holder is adjustable with the condenser housing on the leadscrews 38 and 44 in a direction along the optical axis of the projection system.

The slide holder 36 is, however, movable as desired in directions transverse to the optical axis so as to move the photographic plate carried thereby slowly across the beam 14 emanating from the condenser system. The resulting effect is the production of a slowly moving background scene on the screen 18 thus giving the appearance of a moving scene in the composite picture as taken by the camera 22.

Figure 6:
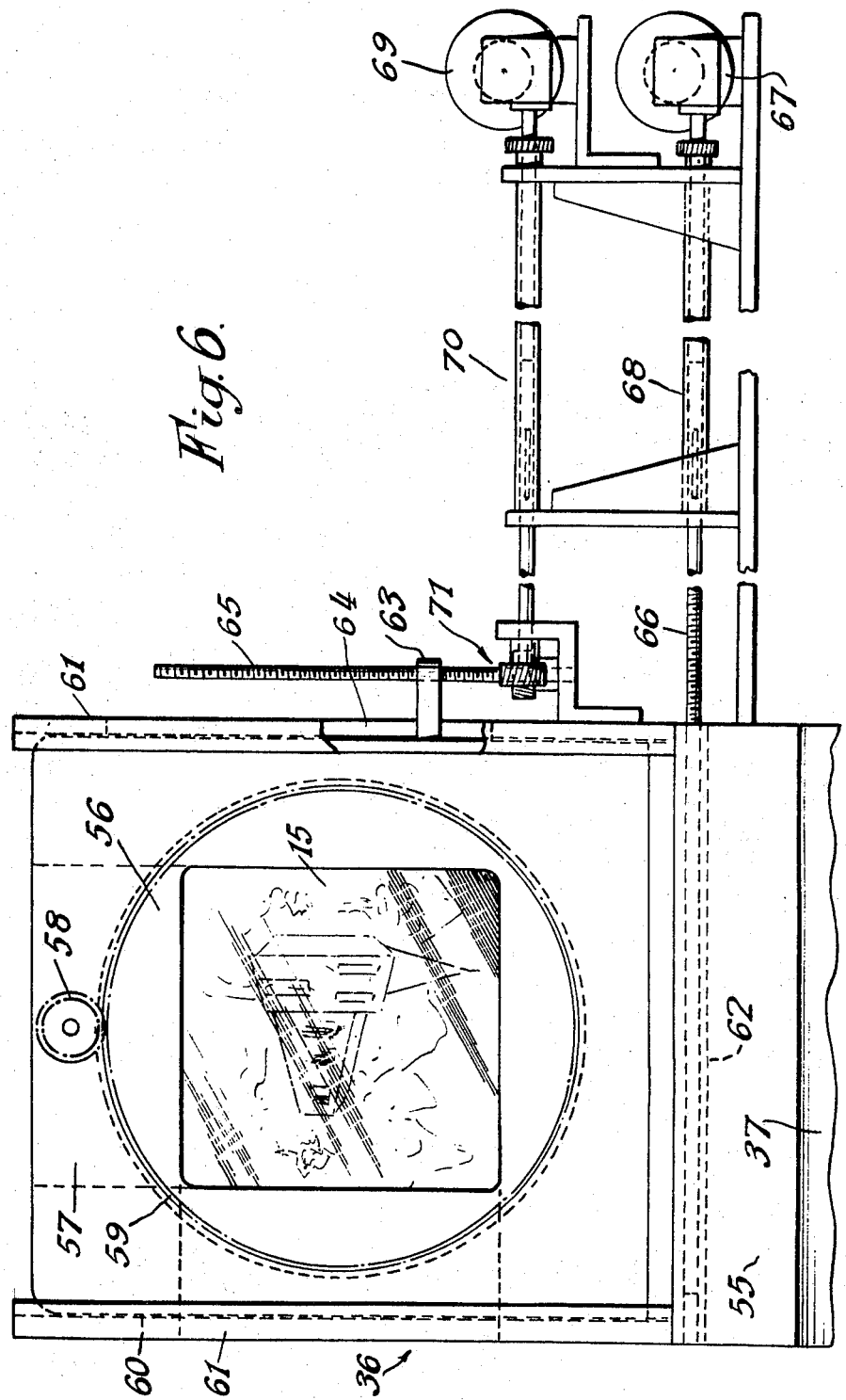
FIG. 6 is a front view of the slide holder showing in particular the motorized control.

As shown more clearly in FIGS. 5 and 6 the plate 15 is mounted in a circular holder 56 which is capable of rotation through 360° in an inner frame 57. A handle 58 rotates holder 56 as desired through a pinion 58 driving engagement with the toothed periphery 59 of the holder.

The inner frame 57 of holder 36 is slidably mounted for vertical movement in grooves 60 in an outer frame 61 (see FIG. 3), which outer frame is slidably mounted for horizontal movement in grooves 62 in the lower rigid support 55 (see FIG. 5).

The inner frame 57 is provided with a lug 63 fixedly mounted thereto and projecting through one of a pair of slots 64 formed in the sidewalls of the outer frame 61 (see FIG. 5). The lug 63 is threadably mounted on a screw 65 so that the frame 57 is movable in a vertical direction in accordance with the rotation of screw 65.

The outer frame 61 is threadably mounted on a screw 66 so that the outer frame (and thereby the inner frame 57 and plate 15) is movable in a horizontal direction in accordance with the rotation of screw 66.

Screw 66 is rotated by a reversible, variable speed electric motor 67 which drives the screw through a splined coupling 68. A similar motor 69 drives screw 65 through a splined coupling 70 and worm and worm-wheel connection 71. The splined connection 70 allows for variations in the length of the drive from motor 69 due to horizontal movement of the outer frame 61 by motor 67. It will be appreciated that various movements of the plate 15 can be obtained by operation of motors 67 and 69 either separately or together and at the same or differing speeds. In the partial plan view of FIG. 3 the positions of the motors 67 and 69 have been staggered for clarity.

The framework structure 31 supports the wide angle focusing lens 16 and the angled semimirror 19. The structure 31 has a top platform 72 provided with members 73 extending parallel to the projection axis to form a slideway 74 therebetween.

The lens 16 is mounted in a bracket 75 slidably mounted in the slideway and adjustable by a knob 76 having a pinion (not shown) engaging a rack 77 at the side of members 73.

The mirror 19 is mounted in a U-shaped frame 78 (see FIGS. 7 and 8) secured to a base 79 which is located on a circular adjusting member 80 and held thereon by locking screws 81 in the overlying flange members 82. The adjusting member 80 is rotatably supported as by suitable bearings 83 on the support 20 which is provided with a key 83 engaging slideway 74 for the lateral movement of mirror 19 along the light projection axis. This movement is obtained by rotation of knob 84 which drives pinion 85 in engagement with the fixed rack 77 on platform 72. After adjustment to a desired location the mirror is locked in position by lockscrew 86.

Angular adjustment of the mirror 19 is obtained by rotation of knob 87 which rotates worm 88 engaging worm wheel 89 rigidly attached to the base of adjusting member 80. The mirror mounting thereby provides full lateral and angular adjustment as desired.

If desired, a second mirror may be provided to allow full panning of the camera in both horizontal and vertical planes as the camera must be located closely to the rear surface of the semimirror.

The third framework structure 32 supports the camera which is provided with full lateral, angular and tilting control. As shown more clearly in FIG. 4 the camera 22 is mounted on a slide 90 movable relatively to the support 91 to adjust the lateral position of the camera, the sliding movement being obtained by rotation of the leadscrew 92 by handwheel 93.

Support 91 includes curved base member 94 mounted in unit 95 under the control of handwheel 96 to permit relative movement of base member 94 and thereby cause tilting of the camera. Fine adjustment of the tilt of the camera 22 is obtained by handle 97 and the adjustment screws 98. Any angular adjustment is obtained by operation of handwheel 99.

The support arrangements for the camera as a separate structure on the wheeled carriage 25 permits panoramic turning or tilting of the camera on the node of the lens 16.

The invention thus provides an improved arc lamp-condenser system providing uniform light coverage for a large photographic field, an improved photographic plate and lens holder to provide horizontal and vertical projection, and an integrated front projection composite photography camera and projector mounting unit which is completely mobile and which provides full independent adjustment of the lamp housing condenser system, focusing lens, mirror support and camera.

I claim:

1. A unit for use in the system of composite photography known as front projection, comprising a self-contained structure supporting a projection system for projecting a separately photographed scene onto a screen as a background picture, a semimirror whereby the projected picture is reflected onto the screen, said mirror being positioned at an angle to the optical axis of projection onto the screen, and a camera setup for photographing a combined scene including said background picture directly through the semimirror along the optical axis of the reflected projection beam; said projection system comprising a light source, a condenser system, a holder for a slide or motion picture film fixedly mounted for movement with the condenser system, and a focusing lens, said light source and condenser system being mounted in separate housings, which housings are separately adjustable so as to enable their positions to be varied relative to each other and to the other parts of the projection system.

2. A unit as claimed in claim 1, wherein the film holder is movable transversely to the optical axis of the projection system in the vertical and/or horizontal directions.

3. A unit as claimed in claim 2, further comprising separate, reversible, variable speed electric motors to move the film holder in the horizontal and vertical directions.

4. A unit as claimed in claim 1, wherein the structure comprises a wheeled carriage.

5. A unit as claimed in claim 4, wherein the light source and condenser system with the film holder are adjustably mounted on a first structure on said carriage, and focusing lens and semimirror are adjustably mounted on a second structure on said carriage, and said camera is adjustably mounted on a third structure on said carriage.

6. A unit as claimed in claim 1, further comprising means mounting the semimirror for adjustment relative to said projection system.

7. A unit for use in the system of composite photography known as front projection, comprising a self-contained structure supporting a projection system for projecting a separately photographed scene onto a screen as a background picture, a semimirror whereby the projected picture is reflected onto the screen, said mirror being positioned at an angle to the optical axis of projection onto the screen, and a camera set up for photographing a combined scene including said background picture directly through the semimirror along the optical axis of the reflected projection beam; said projection system comprising a light source, a condenser system, a holder for a slide or motion picture film, and a focusing lens, said light source and condenser system being mounted in separate housings, which housings are separately adjustable so as to enable their positions to be varied relative to each other and to the other parts of the projection system, wherein the housings for the light source and the condenser system are additionally movable in unison relative to the remaining parts of the projection system.

8. A unit as claimed in claim 7, wherein the housings are mounted on a rotatable lead screw, said lead screw being mounted on a slide mounted on a second rotatable lead screw so as to provide for both coarse and fine adjustments for the positioning of said housings.

9. A unit as claimed in claim 8, wherein each unit is independently adjustable in position on the first lead screw.

10. A unit for use in the system of composite photography known as front projection, comprising a self-contained structure supporting a projection system for projecting a separately photographed scene onto a screen as a background picture, a semimirror whereby the projected picture is reflected onto the screen, said mirror being positioned at an angle to the optical axis of projection onto the screen, and a camera setup for photographing a combined scene including said background picture directly through the semimirror along the optical axis of the reflected projection beam; said projection system comprising a light source, a condenser system, a holder for a slide or motion picture film, and a focusing lens, said light source and condenser system being mounted in separate housings, which housings are separately adjustable so as to enable their positions to be varied relative to each other and to the other parts of the projection system, wherein the focusing lens is a wide angle lens and is mounted for lateral adjustment relative to the other parts of said projection system.

11. A unit for use in the system of composite photography known as front projection, comprising a self-contained structure supporting a projection system for projecting a separately photographed scene onto a screen as a background picture, a semimirror whereby the projected picture is reflected onto the screen, said mirror being positioned at an angle to the optical axis of projection onto the screen, and a camera set up for photographing a combined scene including said background picture directly through the semimirror along the optical axis of the reflected projection beam; said projection system comprising a light source, a condenser system, a holder for a slide or motion picture film, and a focusing lens, said light source and condenser system being mounted in separate housings, which housings are separately adjustable so as to enable their positions to be varied relative to each other and to the other parts of the projection system, wherein the camera is mounted for lateral angular and tilting adjustments relative to said projection system.

* * * * *